(12) United States Patent
Giallorenzi et al.

(10) Patent No.: US 10,598,762 B1
(45) Date of Patent: Mar. 24, 2020

(54) LPD DESCRIPTOR WORD BASED GEOLOCATION

(71) Applicant: L3 Technologies, Inc., New York, NY (US)

(72) Inventors: Thomas R. Giallorenzi, Sandy, UT (US); Radivoje Zarubica, Sandy, UT (US); N. Thomas Nelson, Spanish Fork, UT (US); Philip M. Hirz, Holladay, UT (US); Andrew L. Nelson, Salt Lake City, UT (US)

(73) Assignee: L3 Technologies Inc., New York, NY (US)

( * ) Notice: Subject to any disclaimer, the term of this patent is extended or adjusted under 35 U.S.C. 154(b) by 0 days.

(21) Appl. No.: 16/252,160

(22) Filed: Jan. 18, 2019

(51) Int. Cl.
*G08B 5/22* (2006.01)
*G01S 5/04* (2006.01)
*G01S 5/02* (2010.01)
*G01S 3/48* (2006.01)
*G01S 5/12* (2006.01)

(52) U.S. Cl.
CPC .............. *G01S 5/04* (2013.01); *G01S 3/48* (2013.01); *G01S 5/0226* (2013.01); *G01S 5/0284* (2013.01); *G01S 5/12* (2013.01)

(58) Field of Classification Search
None
See application file for complete search history.

(56) References Cited

PUBLICATIONS

Distortion Filtering for Communications Localization Denial; Beaudeau et al.; Milcom, Oct. 29-31, 2018.*
An Energy Detection Based on Cyclostationary; Han et al; 2011 7th International Conference on Wireless Communications, Networking and Mobile Computing; Sep. 23-25, 2011.*

* cited by examiner

*Primary Examiner* — Adolf Dsouza
(74) *Attorney, Agent, or Firm* — Workman Nydegger (57) ABSTRACT

Geolocating an emitter of a low probability of detection (LPD) signal being transmitted from the emitter in an environment with a noise floor, where the LPD signal is below the noise floor. At a sensor node, a version of the LPD signal is received from the emitter. For the version of the LPD signal, cyclostationary feature detection or energy detection of the version of the LPD signal is performed. A low probability of detection descriptor word, including at least one of a frequency feature of the version of the LPD signal or an energy feature of the version of the LPD signal is created. The low probability of detection descriptor word is provided to a data processor, where the data processor is configured to use a plurality of low probability of detection descriptor words from different sensor nodes for different versions of the LPD signal to geolocate the emitter.

16 Claims, 6 Drawing Sheets

LPD DESCRIPTOR WORD BASED GEOLOCATION

BACKGROUND

Background and Relevant Art

Geo-location techniques can be used to identify the location of various objects. Some such geo-location techniques can be used to locate radio frequency (RF) emitters. Indeed many RF emitters include characteristics that are conducive to locating the emitters, and often are specifically implemented to allow for geo-location of the RF emitters. For example, many emitters, such as RADAR emitters, transmit pulsed signals with high signal to noise ratios. These signals are readily detectable by RF sensor nodes because they are not obfuscated by noise. Additionally, the abrupt changes resulting from the pulsed nature of the signals are readily detectable by sensor nodes. Pulse descriptor words (PDWs) can be passed between distributed platforms which each have a unique vantage point to ascertain where the pulses originated using e.g., time difference of arrival (TDOA), frequency difference of arrival (FDOA), angle of arrival (AoA), or hybrid techniques.

However, other types of signals, i.e., non-pulsed signals with low signal to noise ratios, may not be able to easily use these techniques for geo-location. In particular, consider low probability of detection (LPD) signals. These signals are substantially continuous and not pulsed, and thus have no sudden event to distinguish them. Further, these signals are often intentionally modified so as to ensure that their power remains below the noise floor. This helps to obfuscate the signals further to prevent, or at least minimize, their detection. Modifying the signals to cause them to remain below the noise floor is often performed by applying Direct Sequence Spread Spectrum (DSSS). Thus, geolocating these signals using traditional techniques is not possible.

While geolocating LPD emitters can be accomplished using other techniques, these techniques often require large amounts of data to be transmitted between sensor nodes and/or a processor node for processing the data.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of geolocating an emitter of a low probability of detection (LPD) signal being transmitted from the emitter in an environment with a noise floor, where the LPD signal is below the noise floor. The method includes, at a sensor node, receiving a version of the LPD signal from the emitter. For the version of the LPD signal, cyclostationary feature detection or energy detection of the version of the LPD signal is performed. A low probability of detection descriptor word, including at least one of a frequency feature of the version of the LPD signal or an energy feature of the version of the LPD signal is created. The low probability of detection descriptor word is provided to a data processor, where the data processor is configured to use a plurality of low probability of detection descriptor words from different sensor nodes for different versions of the LPD signal to geolocate the emitter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein are directed to geo-locating LPD emitters. Embodiments may implement a tiered approach for geo-locating. This tiered approach may use techniques that use low bandwidth between nodes when possible, while using techniques requiring higher bandwidths when necessary. Thus, for example, embodiments may use cyclo-stationary feature detection, or energy detection at sensor nodes to identify features of LPD signals, or angles of arrival of signals. Using this information, LPD descriptor words (LDWs) can be generated at the sensor nodes. The LDWs are small data structures describing at least one frequency feature of the LPD signal and/or at least one angle of arrival of the signal. These LDWs can be passed between nodes, to eventually be used by a processor node to determine the location of the emitter of the LPD signal. If acceptable results cannot be obtained using this technique, embodiments can perform cross-correlation of samples of the LPD signals from different sensor nodes using complex ambiguity functions. These techniques require much higher bandwidth between nodes than sending LDWs. However, some embodiments may start by attempting cross-correlation using samples having at least one of limited frequency spectrum, limited time, or limited quantization resolution. If cross-correlation, and geo-location, cannot be accomplished using these limited samples, one or more of frequency spectrum, time, or sample rate can be increased to achieve desired results.

In alternative embodiments, systems may attempt to use geolocation techniques that require high-bandwidth but produce extremely accurate geolocation, such as cross-correlation using complex ambiguity functions. If it is determined that available bandwidth between nodes is low (such as when there are large amounts of noise in an environment), then embodiments can ratchet down the geolocation bandwidth requirements by using samples having at least one of limited frequency spectrum, limited time, or limited quantization resolution. That is, at least frequency spectrum, time, or sample rate will be reduced as compared to a first cross-correlation attempt. If it is determined that bandwidth between nodes is too low for even these types of techniques to be used for geolocation, then embodiments can ratchet down bandwidth requirements further by causing nodes to use cyclostationary feature detection (i.e., statistical analysis of cyclical features of a signal) to collect information to produce LDW's which can be passed between the various nodes. This allows geolocation to be performed in environments where there is limited bandwidth between nodes.

Figure 1:
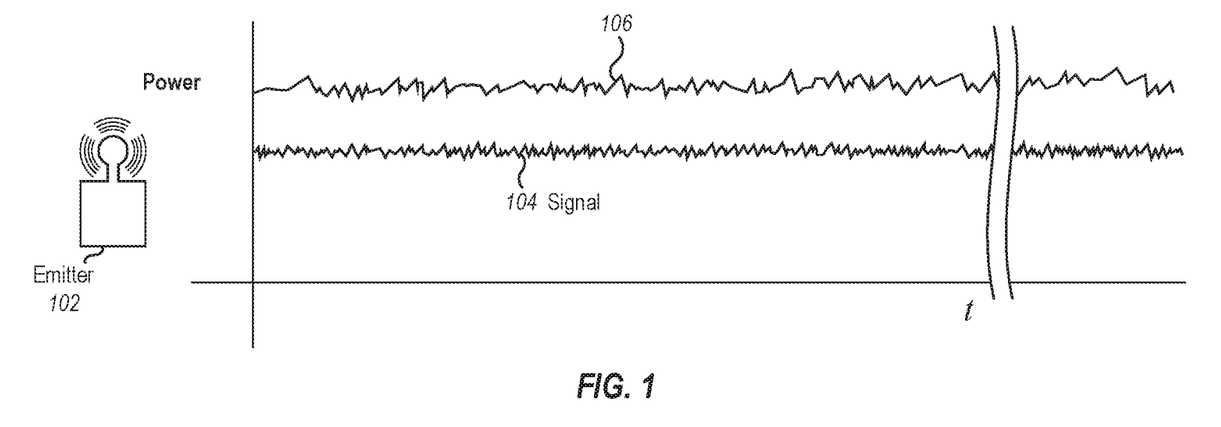
FIG. 1 illustrates an emitter emitting an LPD signal in a noisy environment.

Referring now to FIG. 1, an example is illustrated. FIG. 1 illustrates an emitter 102. The emitter is configured to generate and transmit LPD signals. For example, the emitter 102 may be configured to use a communication signal to modulate a pseudo-noise signal to create a direct sequence spread spectrum signal. The pseudo-noise comprises a continuous sequence of pulses, where each pulse is referred to as a chip, and where the chip rate is the frequency of pulses. The chip rate is typically significantly higher than the carrier frequency of the communication signal. This results in a signal 104 that exists beneath the noise floor 106. In particular, the signal 104 is an LPD signal that is not readily detectable without specialized detection circuitry and techniques.

Figure 2:
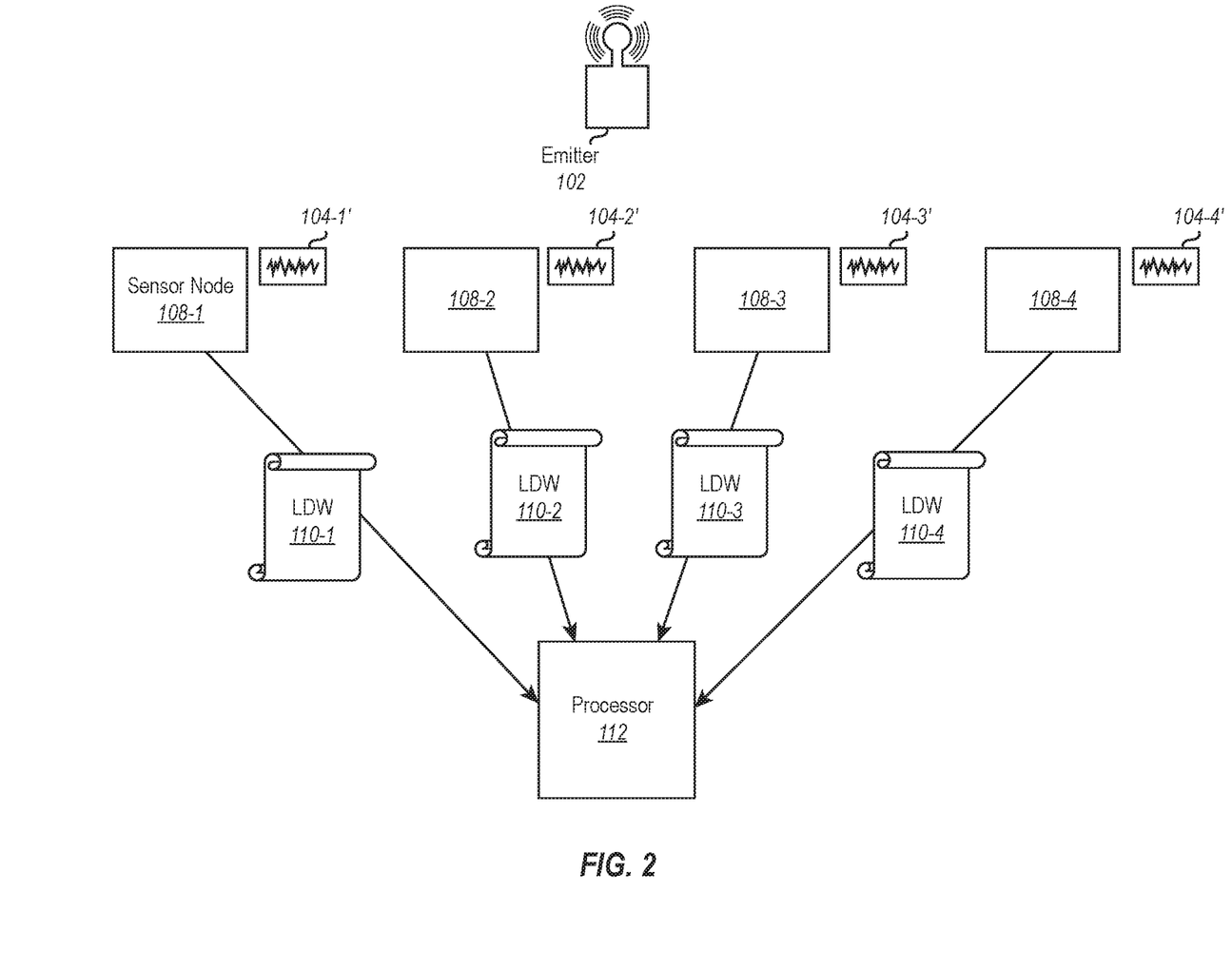
FIG. 2 illustrates an emitter, a set of sensor nodes, and a processor for geo-locating the emitter.

Referring now to FIG. 2, additional details are illustrated. FIG. 2 illustrates the emitter 102. FIG. 2 further illustrates a number of sensor nodes. In particular, FIG. 2 illustrates four sensor nodes 108-1, 108-2, 108-3, and 108-4. Depending on what signal characteristics the sensor nodes are able to detect with respect to the signal 104, different numbers of sensor nodes may be able to provide different types of information. For example, if the sensor nodes are able to identify an angle of arrival for a signal, then it is possible for two sensor nodes to be used to identify, within some margin of error, the two-dimensional location of the emitter 102. If the sensor nodes are able to identify angle of arrival, and three sensor nodes are available, then embodiments can determine an approximate three-dimensional location of the emitter 102. Using angles of arrival over time, embodiments can also detect motion of the emitter 102 with respect to one or more of the sensor nodes, and vice-versa.

If the sensor nodes are able to perform cyclostationary feature detection, such as by using statistical analysis to identify some frequency characteristic of signals received from the emitter 102, then two sensor nodes can be used to identify a direction of the emitter 102, three sensor nodes can be used to identify an approximate two-dimensional location of the emitter 102, and four sensor nodes can be used to identify an approximate three dimensional location of the emitter 102. A cyclostationary signal is one having statistical properties that vary cyclically with time. Details of this functionality will be illustrated in more detail below.

For purposes of the present example, FIG. 2 is used to illustrate using frequency features of received LPD signals to geolocate the emitter 102. Each of the sensor nodes 108-1, 108-2, 108-3, and 108-4 receive altered versions of the signal 104. In particular, FIG. 2 illustrates that sensor nodes 108-1, 108-2, 108-3, and 108-4 receive versions 104-1', 104-2', 104-3', and 104-4' respectively. Each of the versions are altered due to a motion relationship between each of the sensor nodes and the emitter 102. In particular, the example in FIG. 2 assumes that each of the sensor nodes has some type of motion with respect to the emitter 102. This could be based on the sensor node moving, or the emitter 102 moving. Additionally, the motion between each sensor node and the emitter 102 is different between the different sensor nodes. Thus, sensor node 108-1 and the emitter 102 have different motion between them than: the sensor node 108-2 and the emitter 102, the sensor node 108-3 and the emitter 102, and the sensor node 108-4 and the emitter 102. Similarly, the sensor node 108-2 and the emitter 102 have different motion between them than the emitter 102 and the other sensor nodes illustrated in FIG. 2. Similarly, the sensor node 108-3 and the emitter 102 have different motion between them than the emitter 102 and the other sensor nodes illustrated in FIG. 2. Similarly, the sensor node 108-4 and the emitter 102 have different motion between them than the emitter 102 and the other sensor nodes illustrated in FIG. 2. In particular, this different motion between the emitter 102 and the various sensor nodes causes different frequency shifts to create the various different versions of the signal 104.

The motion between the emitter 102 and the various sensor nodes can be accomplished in a number of different ways. For example, if each of the sensor nodes 108-1 through 108-4 are statically located in different locations, and the emitter 102 is dynamically moving, then the motion between the emitter 102 and each of the different sensor nodes will be different. If each of the sensor nodes 108-1 through 108-4 are moving differently with respect to each other, then the motion between the sensor nodes and the emitter 102 will be different for each of the sensor nodes.

Various different frequencies can be considered. For example, some embodiments may use bit rate frequency from the versions 104-1', 104-2', 104-3', and 104-4'. In particular, the bit rate of a communication signal portion of the signal 104 will have a certain 'frequency', i.e., the bitrate. Motion between the emitter 102 and a given sensor node will cause a Doppler shift which affects the bitrate. As will be illustrated in more detail below, the differences in bit rate from the different versions of the signal 104 can be used to geolocate the emitter 102.

In alternative or additional embodiments, embodiments may use chip rate frequencies from the versions 104-1', 104-2', 104-3', and 104-4'. As discussed previously, the chip rate is the rate of pulses in pseudorandom noise used in creating a DSSS signal. Similar to bit rate, motion between the emitter 102 and a given sensor node will cause a Doppler shift which affects the chip rate. Using the Doppler shift from a plurality of different versions of the signal 104, geolocation of the emitter 102 can be performed.

Alternatively or additionally, embodiments may use carrier frequencies from the versions 104-1', 104-2', 104-3', and 104-4'. In particular, the communication signal portion of the signal 104 is modulated using a carrier signal having a particular carrier frequency. Motion between the emitter 102 and a given sensor node will cause a Doppler shift in this carrier frequency. The Doppler shift of the carrier frequency identified in a plurality of different versions of the signal 104 can be used for geolocation purposes to geolocate the emitter 102.

Alternatively or additionally, embodiments may use hop rate frequencies from the versions 104-1', 104-2', 104-3', and 104-4'. In particular, some embodiments may be implemented using frequency hopping spread spectrum (FHSS). FHSS is a communication method where radio signals are transmitted using a carrier signal that switches among a plurality of different frequencies. The switching pattern is known by both the transmitter and receiver allowing the communication signal to be recovered. The hop rate is the rate at which the carrier frequency is changed. Motion between the emitter 102 and a given sensor node will cause a Doppler shift in the hop rate detected at the given sensor node in the version of the signal 104 received at the sensor node. Using a plurality of different Doppler shifts from a plurality of different versions of the signal 104, geolocation can be performed to geolocate the emitter 102.

In particular, each of the different sensor nodes 108-1 through 108-4 will receive a version of the signal 104 that differs in one or more signal frequencies due to Doppler shifts caused by the motion between the sensor nodes and the emitter 102. The different frequencies can be different frequencies for one or more of the types of signals described above including bit rate frequency, chip rate frequency, carrier signal frequency, or hop rate frequency.

The different detected frequencies can be added to LDW's 110-1, 110-2, 110-3, and 110-4 corresponding to the sensor nodes 108-1, 108-2, 108-3, 108-4. These LDW's can then be provided to a processor 112. The processor 112 is able to use the frequencies in the LDW's 110-1 through 110-4 (or whatever subset of the LDW's obtained by the processor 112) to attempt to geolocate the emitter 102. In particular, various known frequency difference of arrival operations can be used to geolocate the emitter 102.

Note that in some embodiments, the LDW's may include information about the location of sensor nodes and/or information about movement of sensor nodes. For example, the LDW 110-1 may include information identifying the location of the sensor node 108-1. Alternatively or additionally, the LDW 110-1 may be populated with information from the sensor node 108-1 identifying movement characteristics of the sensor node 108-1. The LDW 110-2 may include information identifying the location of the sensor node 108-2. Alternatively or additionally, the LDW 110-2 may be populated with information from the sensor node 108-2 identifying movement characteristics of the sensor node 108-2. The LDW 110-3 may include information identifying the location of the sensor node 108-3. Alternatively or additionally, the LDW 110-3 may be populated with information from the sensor node 108-3 identifying movement characteristics of the sensor node 108-3. The LDW 110-4 may include information identifying the location of the sensor node 108-4. Alternatively or additionally, the LDW 110-4 may be populated with information from the sensor node 108-4 identifying movement characteristics of the sensor node 108-4. This location and motion information can be used in the computations used to geolocate the emitter 102.

Note that while the processor 112 is illustrated as an entity separate from the sensor nodes 108-1 through 108-4, it should be appreciated that in some embodiments, the processor 112 may have its functionality implemented by one of the sensor nodes 108-1 through 108-4. Thus, it is not necessary that the processor 112 be included as a separate entity from the sensor nodes 108-1 through 108-4. In some embodiments, the processor 112 may be implemented as a distributed system across multiple different systems. Indeed, in some embodiments, the processor 112 may be implemented in a distributed fashion across the various sensor nodes 108-1 through 108-4. For example, each of the various sensor nodes 108-1 through 108-4 may include processors and other computational hardware configured to perform all or a portion of the frequency difference of arrival computations necessary to geolocate the emitter 102 using cyclostationary feature detection.

Figure 3:
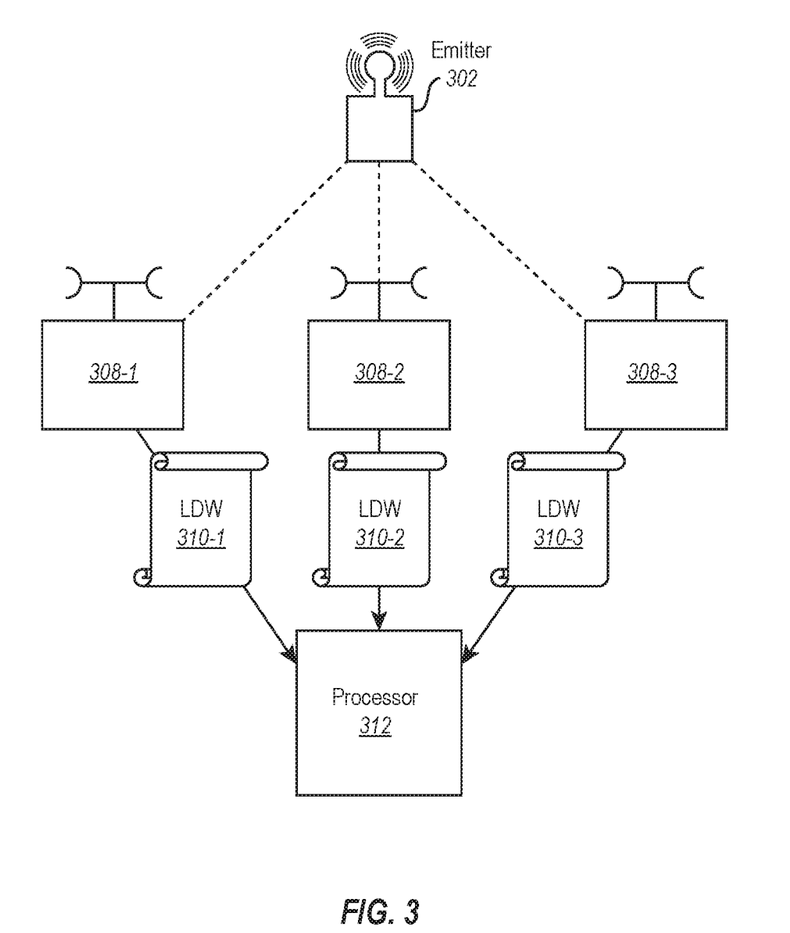
FIG. 3 illustrates another example of an emitter, a set of sensor nodes, and a processor for geo-locating the emitter.

Referring now to FIG. 3, an alternative embodiment is illustrated. FIG. 3 illustrates an example where energy detection of an LPD signal can be used for geolocation of the emitter 302. FIG. 3 illustrates an emitter 302 which transmits the signal 104 to a number of different sensor nodes including sensor node 308-1, 308-2, and 308-3. In this example, each of the sensor nodes includes two antennas which allow the sensor nodes to determine an angle of arrival of the signal 104. Each of the sensor nodes is in a different location, and thus each will have a different angle of arrival that is detected for the signal 104 from the emitter 302. These different angles of arrival can be added to corresponding LDW's. For example, the sensor node 308-1 will detect the angle of the signal 104 arriving from the emitter 302. This detected angle of arrival will be placed in the LDW 310-1 and sent to the processor 312. The angle of arrival of the signal 104 from the emitter 302 at the sensor node 308-2 will be measured. This angle of arrival will be added to the LDW 310-2 and sent to the processor 312. Similarly, the angle of arrival of the signal 104 from the emitter 302 will be detected at the sensor node 308-3. The angle of arrival detected will be added to the LDW 310-3 and sent to the processor 312.

At the processor 312, various computations can be performed to geolocate the emitter 302. In particular, if a single angle of arrival is received from one of the sensor nodes, then a line can be identified, from the location of the sensor node at the identified angle, along which the emitter 302 is likely to exist. If angles of arrival are received from two different sensor nodes, then two lines can be identified, from the location of the two different sensor nodes at the corresponding angles, and where those lines intersect is the probable two-dimensional location of the emitter 302. If angles of arrival are received from 3 different sensor nodes, then 3 lines can be identified, from the location of the three different sensor nodes at the corresponding angles, and where those 3 lines intersect is the probable three-dimensional location of the emitter 302.

Note that in some embodiments, the LDW may further include information identifying the location of a given sensor node. For example, the LDW 310-1 may include information identifying the location of the sensor node 308-1. Similarly, the LDW 310-2 may include information identifying the location of the sensor node 308-2. Similarly, the LDW 310-3 may include information identifying the location of the sensor node 308-3. Thus, in this example, the locations of the various sensor nodes are sent to the processor 312 in the LDW's. Alternatively or additionally, the processor 312 may maintain information about the locations of the various sensor nodes.

Figure 4:
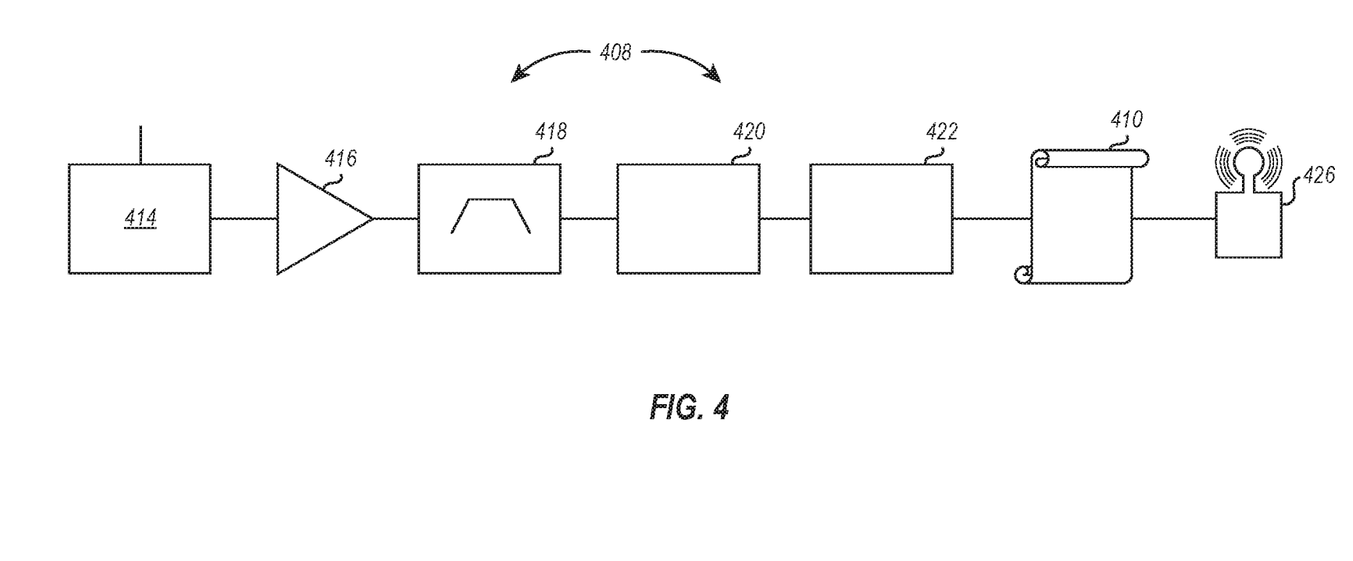
FIG. 4 illustrates a sensor node for creating LDWs for transmitting to processors.

Referring now to FIG. 4, a system for geolocating an emitter of a low probability of detection (LPD) signal being transmitted from the emitter in an environment with a noise floor, where the LPD signal is below the noise floor is illustrated. The system includes a sensor node 408.

The sensor node 408 includes a receiver 414 for receiving a version of the LPD signal from the emitter. For example, the receiver 414 may include one or more antennas. If two or more antennas are included, then the sensor node 408 may be configured to determine angle of arrival of signals from an emitter. The receiver may additionally or alternatively include radio frequency receiver circuitry configured to detect signals of certain types and or bandwidths.

The sensor node 408 may further include an amplifier 416. The amplifier 416 is configured to amplify versions of the LPD signal received from the emitter.

The sensor node 408 may further include a filter 418. The filter 418 may be configured to filter out certain bandwidths from the version of the received signal received from the emitter.

The sensor node 408 may further include a classifier 420. The classifier 420 is configured to perform at least one of cyclostationary feature detection or energy detection of the version of the LPD signal.

The sensor node 408 may further include a data processor 422. The data processor 422 is configured to create a low probability of detection descriptor word 410. The low probability of detection descriptor word 410 includes at least one of a frequency feature of the version of the LPD signal or an energy feature of the version of the LPD signal.

The sensor node 408 further includes a transmitter 426 configured to provide the low probability of detection descriptor word 410 to a data processor, where the data processor is configured to use a plurality of low probability of detection descriptor words from different sensor nodes for different versions of the LPD signal to geolocate the emitter.

In some embodiments, the classifier 420 is configured to perform cyclostationary feature detection to detect a bit rate of the version of the LPD signal.

In some embodiments, the classifier 420 is configured to perform cyclostationary feature detection to detect a chip rate of the version of the LPD signal.

In some embodiments, the classifier 420 is configured to perform cyclostationary feature detection to detect the hop rate of the version of the LPD signal.

In some embodiments, the classifier 420 is configured to perform cyclostationary feature detection to detect a carrier frequency of the version of the LPD signal.

In some embodiments, the classifier 420 is configured to detect an angle of arrival of the version of the LPD signal.

In some embodiments, the system may further include the processor. Indeed, in some embodiments the processor is included in one of the sensor nodes.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
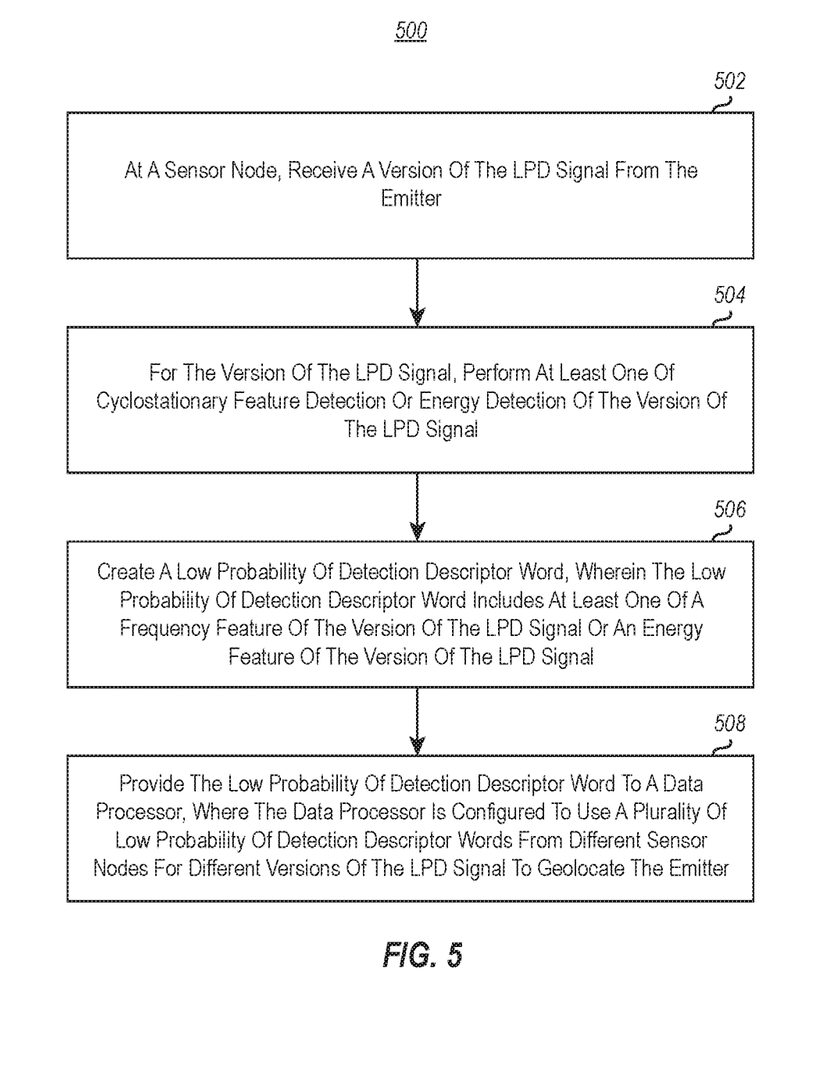
FIG. 5 illustrates a method of geo-locating an LPD signal emitter.

Referring now to FIG. 5, a method 500 is illustrated. A method of geolocating an emitter of a low probability of detection (LPD) signal being transmitted from the emitter in an environment with a noise floor, where the LPD signal is below the noise floor. The method 500 includes at a sensor node, receiving a version of the LPD signal from the emitter (act 502).

The method 500 further includes, for the version of the LPD signal, performing at least one of cyclostationary feature detection or energy detection of the version of the LPD signal (act 504).

The method 500 further includes, creating an LDW, wherein the LDW includes at least one of a frequency feature of the version of the LPD signal or an energy feature of the version of the LPD signal (act 506).

The method 500 further includes, providing the LDW to a data processor, where the data processor is configured to use a plurality of LDW's from different sensor nodes for different versions of the LPD signal to geolocate the emitter (act 508).

The method 500 may be practiced where the cyclostationary feature detection comprises detecting a bit rate of the version of the LPD signal.

The method 500 may be practiced where the cyclostationary feature detection comprises detecting a chip rate of the version of the LPD signal.

The method 500 may be practiced where the cyclostationary feature detection comprises detecting a hop rate of the version of the LPD signal.

The method 500 may be practiced where the cyclostationary feature detection comprises detecting a carrier frequency of the version of the LPD signal.

The method 500 may be practiced where the energy detection comprises detecting an angle of arrival of the version of the LPD signal.

Figure 6:
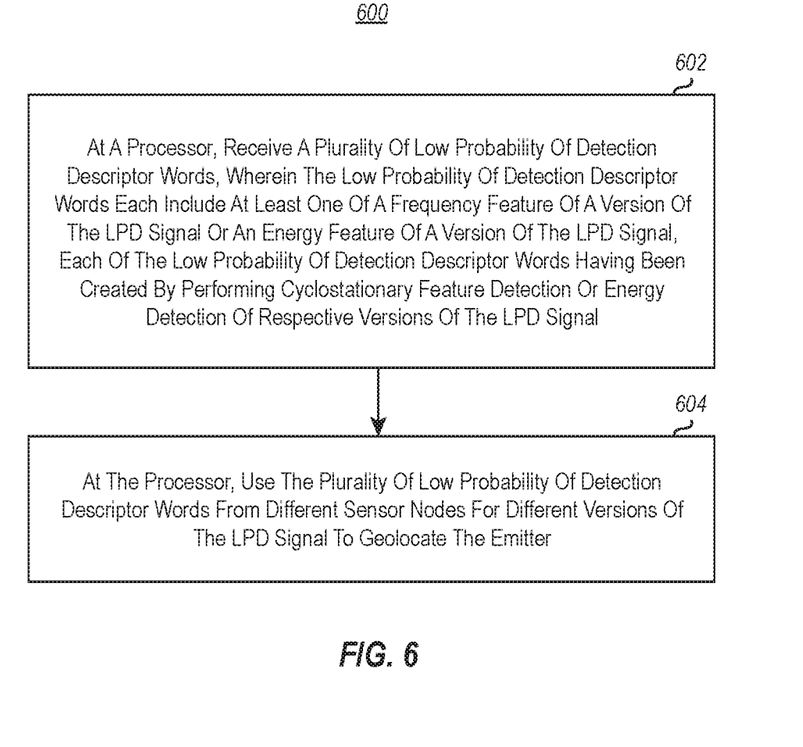
FIG. 6 illustrates another method of geo-locating an LPD signal emitter.

Referring now to FIG. 6, a method of geolocating an emitter of a low probability of detection (LPD) signal being transmitted from the emitter in an environment with a noise floor, where the LPD signal is below the noise floor as illustrated. The method includes at a processor, receiving a plurality of low probability of detection descriptor words, wherein the low probability of detection descriptor words each include at least one of a frequency feature of a version of the LPD signal or an energy feature of a version of the LPD signal, each of the low probability of detection descriptor words having been created by performing cyclostationary feature detection or energy detection of respective versions of the LPD signal (act 602).

The method 600 further includes, at the processor, using the plurality of low probability of detection descriptor words from different sensor nodes for different versions of the LPD signal to geolocate the emitter (604).

The method 600 may be practiced where the method acts are performed as a result of determining that there is insufficient bandwidth to geolocate the emitter using a cross-correlation of versions of the signal from detectors.

The method 600 may be practiced where the acts are performed as a result of the following acts being performed prior to performing the recited acts: performing a first attempt to geolocate the emitter using a cross-correlation of versions of the signal from detectors; determining that the emitter is not able to be detected or detected at a predetermined threshold accuracy using the cross-correlation of versions of the signal from detectors in the first attempt; as a result, performing a second attempt to geolocate the emitter using samples of the versions of the signal having at least one of limited frequency spectrum, limited time, or limited quantization resolution as compared to the first attempt; and determining that the emitter is not able to be detected or detected at a predetermined threshold accuracy in the second attempt.

The method 600 may be practiced where at least one of the low probability of detection descriptor words comprises a bit rate of a version of the LPD signal.

The method 600 may be practiced where at least one of the low probability of detection descriptor words comprises a chip rate of a version of the LPD signal.

The method 600 may be practiced where at least one of the low probability of detection descriptor words comprises a hop rate of a version of the LPD signal.

The method 600 may be practiced where at least one of the low probability of detection descriptor words comprises a carrier frequency of a version of an LPD signal.

The method 600 may be practiced where at least one of the low probability of detection descriptor words comprises an angle of arrival of a version of an LPD signal.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of geolocating an emitter of a low probability of detection (LPD) signal being transmitted from the emitter in an environment with a noise floor, where the LPD signal is below the noise floor, the method comprising:

at a sensor node, receiving a version of the LPD signal from the emitter;

for the version of the LPD signal, performing cyclostationary feature detection of the version of the LPD signal, including detecting at least one of a chip rate of the version of the LPD signal, a hop rate of the version of the LPD signal, or a carrier frequency of the version of the LPD signal;

creating a low probability of detection descriptor word, wherein the low probability of detection descriptor word includes frequency feature of the version of the LPD signal; and providing the low probability of detection descriptor word to a data processor, where the data processor is configured to use a plurality of low probability of detection descriptor words from different sensor nodes for different versions of the LPD signal to geolocate the emitter.

2. The method of claim 1, wherein the cyclostationary feature detection comprises detecting a bit rate of the version of the LPD signal.

3. The method of claim 1, further comprising:
performing energy detection of the version of the LPD signal, wherein the energy detection comprises detecting an angle of arrival of the version of the LPD signal; and
wherein creating a low probability of detection descriptor word, wherein the low probability of detection descriptor word includes an energy feature of the version of the LPD signal.

4. A system for geolocating an emitter of a low probability of detection (LPD) signal being transmitted from the emitter in an environment with a noise floor, where the LPD signal is below the noise floor, the system comprising:
a sensor node, wherein the sensor node comprises:
a receiver for receiving a version of the LPD signal from the emitter;
a classifier configured to perform energy detection of the version of the LPD signal, wherein the classifier is configured to detect an angle of arrival of the version of the LPD signal;
a data processor configured to create a low probability of detection descriptor word, wherein the low probability of detection descriptor word includes an energy feature of the version of the LPD signal; and
a transmitter configured to provide the low probability of detection descriptor word to a data processor, where the data processor is configured to use a plurality of low probability of detection descriptor words from different sensor nodes for different versions of the LPD signal to geolocate the emitter.

5. The system of claim 4, wherein the classifier is configured to perform cyclostationary feature detection to detect a bit rate of the version of the LPD signal.

6. The system of claim 4, wherein the classifier is configured to perform cyclostationary feature detection to detect a chip rate of the version of the LPD signal.

7. The system of claim 5, wherein the classifier is configured to perform cyclostationary feature detection to detect the hop rate of the version of the LPD signal.

8. The system of claim 4, wherein the classifier is configured to perform cyclostationary feature detection to detect a carrier frequency of the version of the LPD signal.

9. The system of claim 4, wherein the data processor is configured to create the low probability of detection descriptor word by including at least one frequency feature of the version of the LPD signal.

10. The system of claim 4, further comprising the processor.

11. The system of claim 10 wherein the processor is integrated into the sensor node.

12. A method of geolocating an emitter of a low probability of detection (LPD) signal being transmitted from the emitter in an environment with a noise floor, where the LPD signal is below the noise floor, the method comprising:
at a processor, a first method act of receiving a plurality of low probability of detection descriptor words, wherein the low probability of detection descriptor words each include at least one of a frequency feature of a version of the LPD signal or an energy feature of a version of the LPD signal, each of the low probability of detection descriptor words having been created by performing cyclostationary feature detection or energy detection of respective versions of the LPD signal;
at the processor, a second method act of using the plurality of low probability of detection descriptor words from different sensor nodes for different versions of the LPD signal to geolocate the emitter; and
wherein the first and second method acts are performed as a result of determining that there is insufficient bandwidth to geolocate the emitter using a cross-correlation of versions of the signal from detectors.

13. The method of claim 12, wherein the first and second method acts are performed as a result of the following acts being performed prior to performing the recited acts:
performing a first attempt to geolocate the emitter using a cross-correlation of versions of the signal from detectors;
determining that the emitter is not able to be detected or detected at a predetermined threshold accuracy using the cross-correlation of versions of the signal from detectors in the first attempt due to insufficient bandwidth between the processor and one or more of the sensor nodes;
as a result, performing a second attempt to geolocate the emitter using samples of the versions of the signal having at least one of limited frequency spectrum, limited time, or limited quantization resolution as compared to the first attempt; and
determining that the emitter is not able to be detected or detected at a predetermined threshold accuracy in the second attempt.

14. The method of claim 12, wherein at least one of the low probability of detection descriptor words comprises a bit rate of a version of the LPD signal.

15. The method of claim 12, wherein at least one of the low probability of detection descriptor words comprises a chip rate of a version of the LPD signal.

16. The method of claim 12, wherein at least one of the low probability of detection descriptor words comprises a hop rate of a version of the LPD signal.

* * * * *